(12) United States Patent
Moreaux et al.

(10) Patent No.: US 7,801,940 B2
(45) Date of Patent: Sep. 21, 2010

(54) METHOD FOR DIVIDING A NUMBER BY A FRACTION HAVING A NUMBER IN THE FORM OF A POWER OF 2 AT THE NUMERATOR

(75) Inventors: Christophe Moreaux, Simiane (FR); Ahmed Kari, Aix en Provence (FR); David Naura, Aix en Provence (FR); Pierre Rizzo, Aix en Provence (FR)

(73) Assignee: STMicroelectronics SA, Montrouge (FR)

( * ) Notice: Subject to any disclaimer, the term of this patent is extended or adjusted under 35 U.S.C. 154(b) by 945 days.

(21) Appl. No.: 11/612,765

(22) Filed: Dec. 19, 2006

(65) Prior Publication Data
US 2007/0146174 A1 Jun. 28, 2007

(30) Foreign Application Priority Data
Dec. 20, 2005 (FR) .................................. 05 12913

(51) Int. Cl.
*G06F 7/535* (2006.01)
(52) U.S. Cl. .................................................... 708/653
(58) Field of Classification Search ........................ None
See application file for complete search history.

(56) References Cited
U.S. PATENT DOCUMENTS 3,631,230 A * 12/1971 Chen ........................ 708/231
4,381,550 A * 4/1983 Baker ........................ 708/655
4,481,600 A * 11/1984 Asai ............................ 708/654
4,727,506 A 2/1988 Fling
5,001,663 A 3/1991 Parulski et al. .............. 364/760
5,132,925 A * 7/1992 Kehl et al. .................. 708/653
5,140,544 A * 8/1992 Lin et al. .................... 708/650
5,402,369 A 3/1995 Main ........................ 364/757
5,696,713 A 12/1997 Kovacs ...................... 364/764
6,487,575 B1 * 11/2002 Oberman .................... 708/504
6,795,553 B1 * 9/2004 Kobayashi et al. ............ 380/28
2004/0167956 A1 * 8/2004 Vihriala ...................... 708/654

FOREIGN PATENT DOCUMENTS
EP  1 220 087  7/2002

OTHER PUBLICATIONS
Srinivasan, P., et al., "Constant-division algorithms," *IEE Proc.-Comput. Digit. Tech.*, vol. 141, No. 6, Nov. 1994, pp. 334-340.

* cited by examiner

*Primary Examiner*—David H Malzahn
(74) *Attorney, Agent, or Firm*—Lisa K. Jorgenson; Robert Iannucci; Seed IP Law Group PLLC

(57) ABSTRACT

A method divides a number N1 by a number which can be written in the form $2^n/k$, n and k being whole numbers, and obtains a result N2. The result N2 is calculated by adding terms $N1*Ki/2^{n-i}$ for i ranging from 0 to N, the terms Ki being the constituent bits $K0, K1, K2, \ldots K_{N-1}$ of the number k expressed in binary. The method can be applied particularly to the production of a calibration circuit for calibrating a clock signal in a UHF transponder.

25 Claims, 3 Drawing Sheets

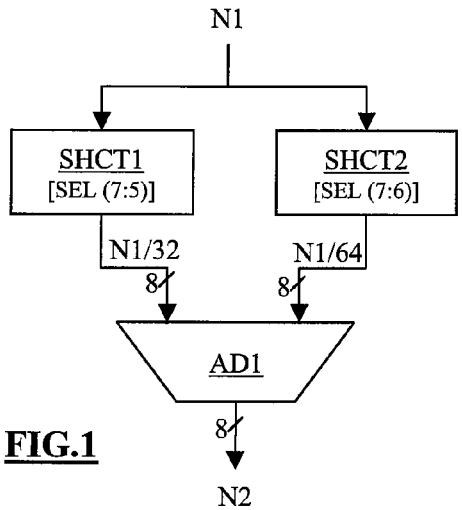 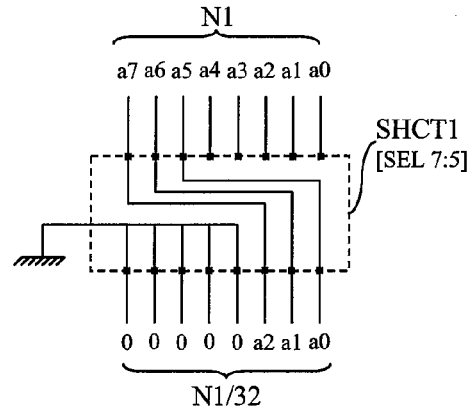
FIG.1  FIG.2
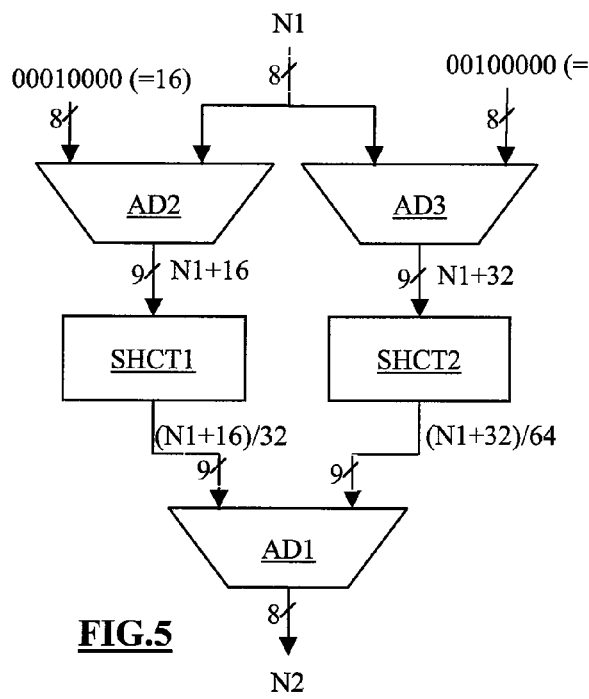 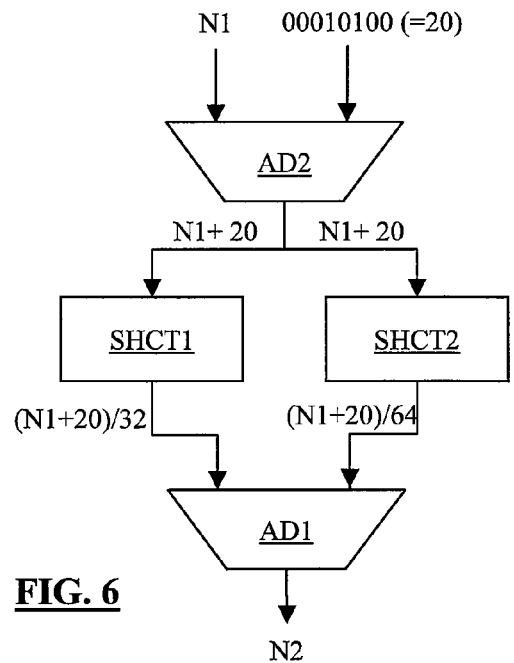
FIG.5  FIG. 6

METHOD FOR DIVIDING A NUMBER BY A FRACTION HAVING A NUMBER IN THE FORM OF A POWER OF 2 AT THE NUMERATOR

BACKGROUND OF THE INVENTION

1. Field of the Invention

The present invention relates to a method for dividing a first binary number N1 by a second binary number which can be written in the form $2^n/k$, n and k being whole numbers, to obtain a result N2.

2. Description of the Related Art

Binary division is an arithmetic operation which can be implemented in various ways in an integrated circuit. When possible, the binary division can be done with a hard-wired logic circuit having a very simple structure. For example, the division of a number N1 by a number forming a power of 2, i.e., the calculation of $N1/2^n$, is done by performing n right shifts of the bits of the number N1. For example, the division of 15, i.e., 00001111 in binary, by 16, is obtained by performing four right shifts of the bits of the number N1, because $16=2^4$. The number 00000000.1111 is obtained, i.e., 0.9375 in decimal.

Within the scope of the production of a radio frequency identification (RFID) contactless integrated circuit conforming to the industrial specification EPC™-GEN2 ("*Radio-Frequency Identity Protocols Class*-1 *Generation*-2—*UHF RFID Protocol for Communications at 860 MHz-960 MHz*"), the authors of the present invention were faced with the need to provide a circuit capable of dividing a binary number by 64/3.

Such a division by 64/3 is provided for by the above-mentioned specification to divide a counting value supplied by a counter that is activated for the duration of an event. The counting is paced by an internal clock signal. After acquisition of the counting value, the integrated circuit divides this value by 64/3. The result of the division is then used as a set-point value for supplying an output signal the period of which is synchronized with the duration of the event.

Although such a division can be done with sophisticated calculation algorithms, using a microprocessor or an arithmetic coprocessor, the UHF contactless integrated circuits produced according to the specification EPC™-GEN2 are intended for the manufacture of low cost price contactless tags. They should consequently have a very simple structure. Thus, the use of a costly calculation circuit which occupies a large surface area of silicon is not possible. In particular, the use of a microprocessor or of a coprocessor is ruled out. The division should be done by a hard-wired logic circuit and preferably asynchronously, i.e., without the need to pace calculation steps by means of a clock signal.

BRIEF SUMMARY OF THE INVENTION

One embodiment of the present invention provides a method enabling, in particular, a number N1 to be divided by 64/3, in a simple manner and by a hard-wired logic circuit.

One embodiment of the invention provides a method for dividing a first binary number N1 by a second binary number which can be written in the form $2^n/k$, n and k being whole numbers, and obtaining a result N2, the method comprising a step of calculating terms $N1*Ki/2^{n-i}$ by a first hard-wired logic circuit, for i ranging from 0 to N, the terms Ki being the constituent bits K0, K1, K2, ... $K_{N-1}$ of the number k expressed in binary, and a step of adding the terms $N1*Ki/2^{n-i}$ by a second hard-wired logic circuit.

According to one embodiment, the method comprises, for calculating each term $N1*Ki/2^{n-i}$ for which Ki=1, the application of n–i right shifts to the bits of the number N1, without any carry after the decimal point and with the introduction of a rounding error.

According to one embodiment, the rounding error in the division of N1 by $2^{n-i}$ is offset in whole or in part by adding an offset to the number N1 before applying the n–i right shifts to the bits of the number N1.

According to one embodiment, an identical offset is added to the number N1 for calculating each term $N1*Ki/2^{n-i}$ for which Ki=1.

According to one embodiment, the number N1 is supplied by a counter configured to count from the offset instead of counting from 0.

According to one embodiment, k=3, and $N2=N1/2^n+N1/2^{n-1}$, the term $N1/2^n$ being calculated by applying n right shifts to the bits of a number equal to the sum of N1 and of a first offset, the term $N1/2^{n-1}$ being calculated by applying n–1 right shifts to the bits of a number equal to the sum of N1 and of a second offset, the first and second offsets possibly being equal.

One embodiment of the present invention is a divider circuit for dividing a first binary number N1 by a second binary number which can be written in the form $2^n/k$, n and k being whole numbers, and obtaining a result N2, the circuit comprising a first hard-wired logic circuit for calculating terms $N1*Ki/2^{n-i}$ for i ranging from 0 to N, Ki being the constituent bits K0, K1, K2, ... $K_{N-1}$ of the number k expressed in binary, and a second hard-wired logic circuit for adding the terms $N1*Ki/2^{n-i}$.

According to one embodiment, the first hard-wired logic circuit is arranged for calculating each term $N1*Ki/2^{n-i}$ for which Ki=1 by applying n–i right shifts to the bits of the number N1, without any carry after the decimal point and with the introduction of a rounding error.

According to one embodiment, the divider circuit comprises means for adding an offset to the number N1 before applying the right shifts to the bits of the number N1, so as to offset in whole or in part the rounding error in the division of N1 by $2^{n-i}$.

According to one embodiment, the means for adding an offset apply an offset identical to the number N1 for calculating each term $N1*Ki/2^{n-i}$ for which Ki=1.

According to one embodiment, the number N1 is supplied by a sampling counter configured to count from the offset instead of counting from 0, so as to supply the number N1 increased by the offset.

According to one embodiment in which k=3, and $N2=N1/2^n+N1/2^{n-1}$, the term $N1/2^n$ is supplied by a first hard-wired logic circuit which applies n right shifts to the bits of a number equal to the sum of N1 and of a first offset, and the term $N1/2^{n-1}$ is supplied by a second hard-wired logic circuit which applies n–1 right shifts to the bits of a number equal to the sum of N1 and of a second offset, the first and second offsets possibly being equal.

The present invention also relates to an integrated circuit, particularly of the transponder type, comprising a divider circuit according to the present invention.

According to one embodiment, the divider circuit is arranged for dividing a counting value supplied by a counter.

According to one embodiment, the counter is configured to count from an offset value instead of counting from 0, so as to supply the number N1 increased by the offset.

BRIEF DESCRIPTION OF THE SEVERAL VIEWS OF THE DRAWINGS

These and other advantages and features of the present invention shall be presented in greater detail in the following description of the method of the present invention and of examples of embodiments of hard-wired logic dividers implementing this method, given in relation with, but not limited to the following figures, in which:

FIG. 1 represents in the form of a block diagram a hard-wired logic divider implementing a first aspect of the present invention, FIG. 2 represents an embodiment of a shift circuit represented in block form in FIG. 1, FIG. 5 represents in the form of a block diagram an example of an embodiment of a hard-wired logic divider implementing the first and second aspects of the present invention, FIG. 6 represents in the form of a block diagram an alternative embodiment of the divider in FIG. 5, FIG. 7 schematically represents the structure of a contactless integrated circuit.

DETAILED DESCRIPTION OF THE INVENTION

Figure 3:
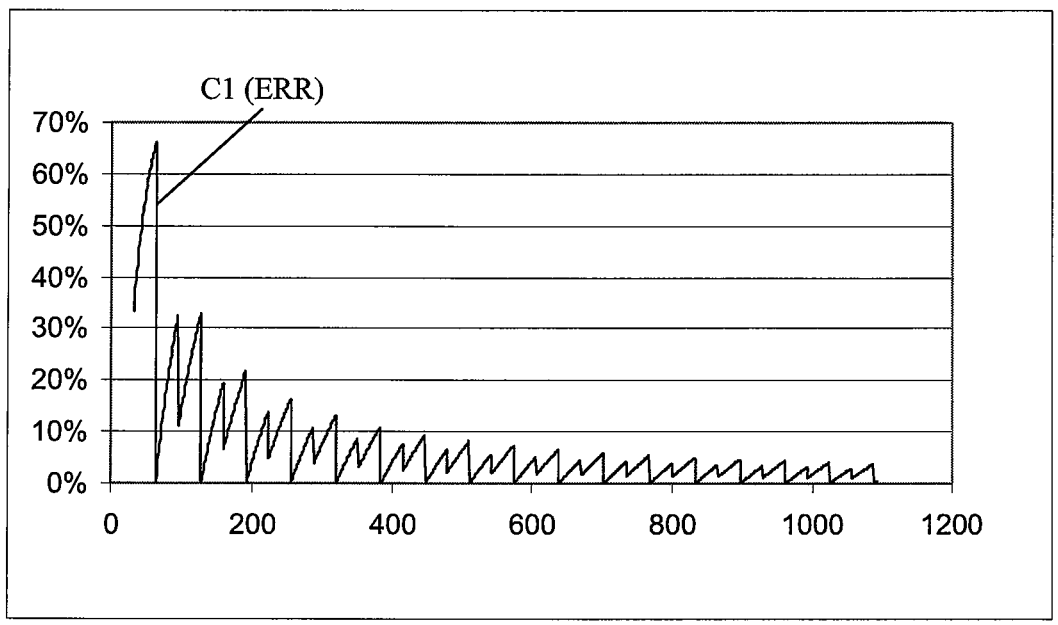
FIG. 3 represents a distribution curve of the rounding errors obtained when a number is divided by right shift without any carry after the decimal point.

One embodiment of the present invention provides a division method that is very simple to implement. A first aspect of one embodiment of the present invention relates to the implementation of the division in the form of basic calculation steps, and a second aspect relates to the compensation of rounding errors introduced by the basic calculation steps.

First Aspect

As stated above, one embodiment of the present invention divides a binary number by 64/3 using a hard-wired logic circuit. The division can be generalized in the form of a general division, i.e.: dividing a number N1 by a number which can be written in the form $2^n/k$, n and k being whole numbers. Indeed it can be seen that $64=2^6$.

One embodiment of the present invention breaks down the number $k/2^n$ into series form. First of all, it is considered that dividing the number N1 by $2^n/k$ amounts to multiplying N1 by $k/2^n$. By calling N2 the result of the division, the following can thus be written:

$$N2 = N1/(2^n/k) = N1 * k/2^n \quad (1)$$

Furthermore, the number k can be written, in binary, in the following form:

$$k = K0*2^0 + K1*2^1 + K2*2^2 + \ldots + K_{N-1}*2^{(N-1)} \quad (2)$$

$K0, K1, K2, \ldots K_{N-1}$ being the constituent bits of the number k, equal to 0 or to 1.

By combining the equations (1) and (2), it comes that $k/2^n$ can be written in the following form:

$$k/2^n = K0*2^0/2^n + K1*2^1/2^n + K2*2^2/2^n + \ldots + K_{N-1}*2^{(N-1)}/2^n \quad (3)$$

i.e.:

$$k/2^n = K0/2^n + K1/2^{n-1} + K2/2^{n-2} + \ldots + K_{N-1}/2^{(n-(N-1))} \quad (4)$$

By combining the equations (1) and (4), it comes that:

$$N2 = N1*K0/2^n + N1*K1/2^{n-1} + N1*K2/2^{n-2} + \ldots + N1*K_{N-1}/2^{(n-(N-1))} \quad (5)$$

The result of the division of N1 by $2^n/k$ is therefore equal to the sum of terms $N1*Ki/2^{n-i}$ for i ranging from 1 to N−1, i.e.:

$$`N2 = \sum_{i=0}^{i=N-1} N1 * Ki/2^{n-i} \quad (6)$$

Each of these terms is zero when Ki=0 and is non-zero when Ki=1. A non-zero term $N1*Ki/2^{n-i}$ is therefore equal to $N1/2^{n-i}$. Thus, each non-zero term is the result of the division of the number N1 by a power of 2.

In the specific case of the division by 64/3, n is equal to 6 and k is equal to 3. Thus, k is equal to 00000011 in binary, i.e., K0=1 and K1=1, the other bits $K_i$ being equal to 0. The equation (6) becomes:

$$N2 = N1/(2^6) + N1/(2^5) = N1/64 + N1/32 \quad (7)$$

N2 is thus the sum of the results of two divisions. According to the present invention, each division is done by right shifting the constituent bits of the number N1 and without any carry after the decimal point.

FIG. 1 represents a divider according to one embodiment implementing the equation 7. It is assumed here that the divider is a circuit operating with 8 bits. The divider comprises two shift circuits SHCT1, SHCT2 each receiving the number N1 at input and respectively supplying the terms N1/32 and N1/64. The output of each divider SHCT1, SHCT2 is applied to an input of an adding circuit AD1 the output of which supplies the result N2=N1/64+N1/32, i.e., N2=N1/(64/3) in accordance with the relation 7.

Each shift circuit SHCT1, SHCT2 performs a simple right shift of the most significant bits towards the least significant bits with insertion of 0 from the left (a so-called "right" shift by convention, it being implied that the most significant bits are on the left). The circuit SHCT1 applies five right shifts to the bits of the number N1, i.e., a division by 32 ($2^5$) while the circuit SHCT2 applies six right shifts to the bits of the number N1, i.e., a division by 64 ($2^6$).

FIG. 2 represents an example of an embodiment of the circuit SHCT1. This circuit simply switches the bits a7, a6, a5 so that these bits become the bits a2, a1, a0 of the result N1/32, the most significant bits being set to 0. The same principle is used to produce the circuit SHCT2 (not represented), the bits a7, a6 becoming the bits a1, a0 of the result N1/64.

This method of dividing the number N1 by 64/3 can be generally applied to any division by $2^n/k$, as shown by the equation 6. However, it has the disadvantage of introducing a rounding error due to the fact that the steps of dividing by $2^n$, $2^{n-1}$, $2^{n-2}$ ... are performed without any carry after the decimal point.

Second Aspect

It can be shown that the error on the result is all the more significant as the number N1 to be divided is small. For a better understanding, FIG. 3 represents the curve C1 of the relative rounding error of the result of the division of the number N1 by 64/3 as supplied by the divider in FIG. 1.

The relative rounding error "ERR" is defined as being equal to:

$$ERR = ER/(N1/64/3) \tag{8}$$

"ER" being an absolute rounding error, that is defined as being equal to:

$$ER = N1/(64/3) = (\text{Full portion } (N1/64) + \text{Full portion} \\ (N1/32)) \tag{9}$$

The curve C1 shows that if a relative rounding error lower than 10% is targeted (ordinate value) the number N1 (abscissa) must be greater than 385.

Now, in an application described below, the number N1 is the result of a count paced by a signal of frequency Fc and performed for the entire duration of an event. In such an application, the error could thus be reduced by increasing the counting frequency Fc so that the number N1 is as high as possible for a constant duration of the event. It would then be sufficient to divide the result by the number by which the counting frequency Fc was increased. However, such a method is not desirable because, generally speaking, increasing the frequency of a signal applied to a binary counter increases the current consumption of the counter (in integrated circuits, current consumption increases with the switching frequency).

One embodiment decreases the error on the result of a division of N1 by $2^n$ done by right shift without any carry after the decimal point, without the need to increase the value of N1.

The embodiment calculates, for any known value of n, an offset which can be added to the number N1 before the right shift, that is such that the rounding error obtained will always be lower than the rounding error obtained without adding the offset. This rule can be expressed by the following relation:

$$ERR[(N1+\text{offset})/2^n] < ERR[N1/2^n] \tag{10}$$

More particularly, it can be shown that the optimal offset value for a division by $2^n$ is equal to half of the divisor, i.e., $2^n/2^{n-1}$ or $2^{n-1}$, i.e., again 32 for a division by 64, and 16 for a division by 32.

As an example, Table 1 below describes the binary division of the number 63 by the number 32, done in five right shifts without any carry after the decimal point, in which an offset equal to 16 is added to the number to be divided before applying the right shifts.

TABLE 1

| bits / decimal values | a7 | a6 | a5 | a4 | a3 | a2 | a1 | a0 |
|---|---|---|---|---|---|---|---|---|
| N1 = 63 | 0 | 0 | 1 | 1 | 1 | 1 | 1 | 1 |
| offset = 16 | 0 | 0 | 0 | 1 | 0 | 0 | 0 | 0 |
| N1' = 63 + 16 | 0 | 1 | 0 | 0 | 1 | 1 | 1 | 1 |
| N2 = (63 + 16)/32 | 0 | 0 | 0 | 0 | 0 | 0 | 1 | 0 |

N2=00000010 is obtained, i.e., 2 in decimal, instead of the exact value 2.03. The error is therefore slight. Without the offset, 00000001 would have been obtained, i.e., 1 in decimal and a 100% relative error.

FIG. 5 represents an improvement of the circuit in FIG. 1 based on this second aspect. Here, an offset equal to 16 is added to the number N1 at the input of the shift circuit SHCT1 (divider by 32) and an offset equal to 32 is added to the number N1 at the input of the shift circuit SHCT2 (divider by 64). The two offsets are here added by means of two adders AD2 and AD3. The result N2 obtained is thus equal to:

$$N2 = (N1+32)/64 + (N1+16)/32 \tag{11}$$

In this embodiment, the adders AD2 and AD3 preferably have 8 bits at input and 9 bits at output, so as to take into account the carry bit that can appear when the offsets 16 and 32 are added to the number N1. Similarly, the adder AD1 preferably has 9 bits at each of its inputs and 8 bits at output.

There is also an optimal common offset which can be added to the number N1 before it is divided by $2^n$, $2^{n-1}$, $2^{n-2}$ . . . so as to minimize the error on the result of the equation (6). In the case of the division by 64/3, the optimal common offset to be added to the number N1 is equal to 20. Therefore, this optimal offset is not equal to the average of the two offsets 16 and 32. It can easily be found for any other value of k and of n by scanning several offset values between the respective optimal offsets for each of the divisions.

FIG. 6 represents an alternative embodiment implementing this improvement. A common offset equal to 20 is added to the number N1 at the input of the shift circuit SHCT1 (divider by 32) and at the input of the shift circuit SHCT2 (divider by 64). The common offset is added by a single adder AD2 having 9 bits at output. The result N2 obtained is equal to:

$$N2 = (N1+20)/64 + (N1+20)/32 \tag{12}$$

It will be understood that the operator "/" appearing in the equations 11 and 12 does not designate the classic arithmetic division but a binary division without any carry after the decimal point, otherwise these equations would be inaccurate.

The advantage of the equation (12) over the equation (11) is that it enables the structure of the divider, that only comprises two adders in FIG. 6 instead of three adders in FIG. 5, to be simplified.

Furthermore, it will be seen below that this optimal common offset can be added to the number N1 in an even easier way, without using any adder, when the number N1 is supplied by a counter.

Figure 4:
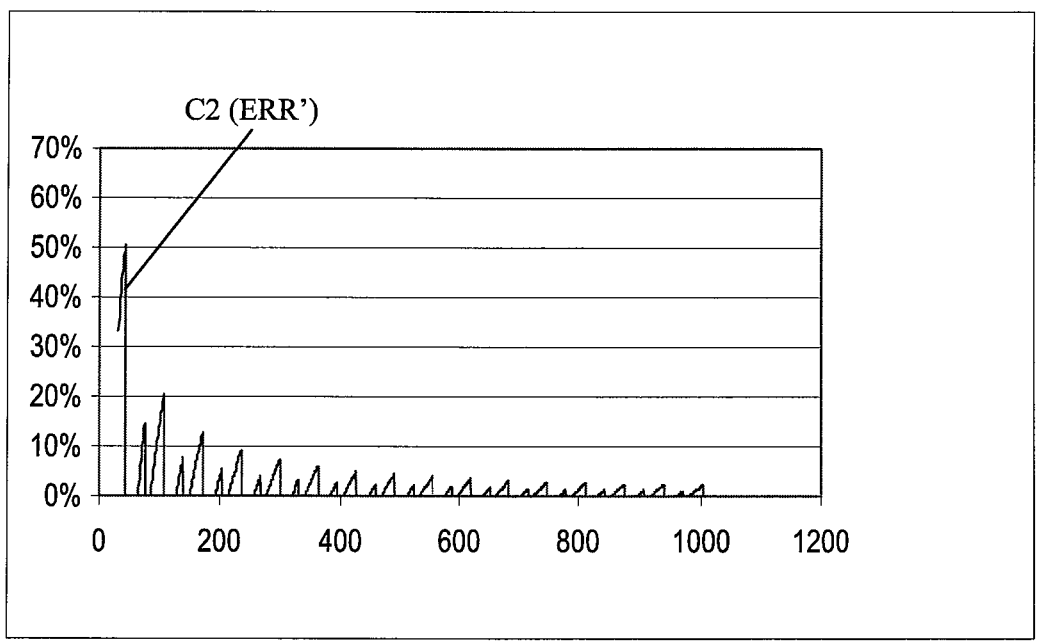
FIG. 4 represents a distribution curve of the rounding errors when the division by right shift is preceded by an error correcting step according to a second aspect of the present invention.

FIG. 4 represents the curve C2 of the relative rounding errors ERR' obtained when N1 is divided in accordance with the equation (12), by adding 20 to N1 before dividing it by 32 and 64 and by performing the divisions by right shift without any carry after the decimal point. The curve C2 is lower than the curve C1 (FIG. 3) and shows that the error ERR' is smaller than the error ERR. Thus, if a relative rounding error ERR' below 10% is sought, the number N1 (abscissa) must be greater than 174, whereas it must be greater than 385 when the common offset is not provided (curve C1).

Figure 7:
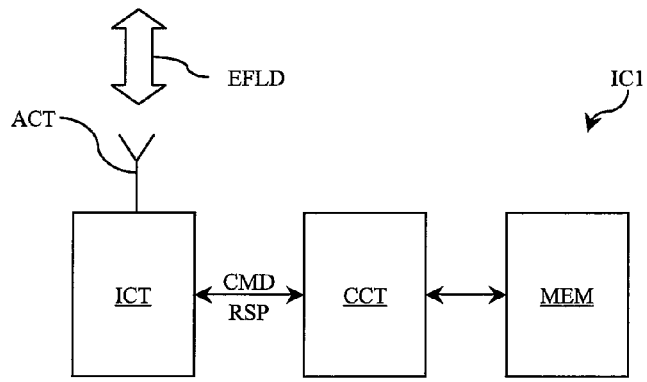

An embodiment of the present invention as a contactless integrated circuit IC1 as represented in FIG. 7 will now be described. The integrated circuit IC1 is a UHF transponder comprising a contactless communication interface circuit ICT, a control circuit CCT and an electrically erasable and programmable (EEPROM or FLASH) memory MEM. The circuit ICT is linked to an antenna circuit ACT in the dipole form enabling it to receive coded data by modulating an electric field EFLD oscillating at a UHF frequency, such as 800 MHz for example, the field EFLD being emitted by a contactless integrated circuit reader. The circuit ICT also sends data, here by modulating the reflection coefficient of the antenna circuit ACT ("backscattering" technique). The control circuit CCT is preferably a hard-wired logic circuit.

The circuit CCT thus receives commands CMD via the interface circuit ICT (commands for reading or writing the memory for example), and sends responses RSP via the circuit ICT. The contactless communication protocol used is for example defined by the industrial specification EPC™-GEN2.

Figure 8:
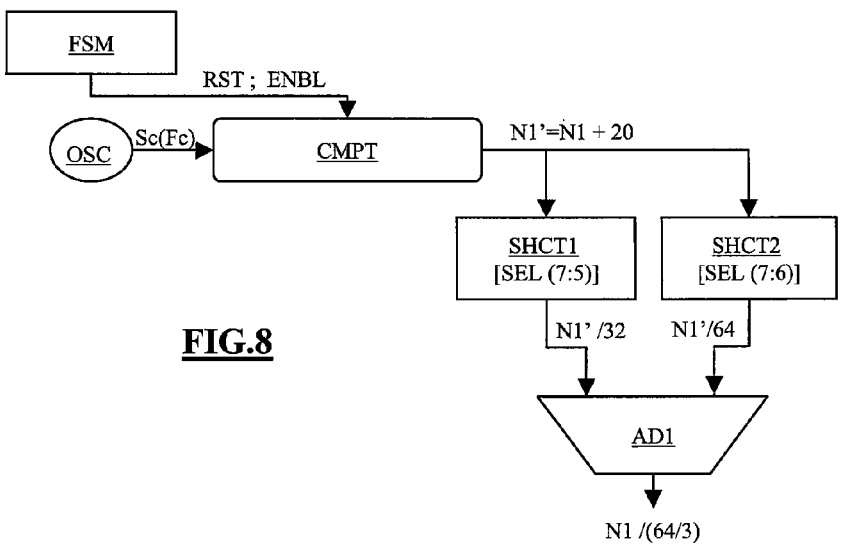
FIG. 8 represents elements of the integrated circuit in FIG. 7 implementing the method of the present invention.

Inside the control circuit CCT a synchronization circuit schematically shown in FIG. 8 is provided. The synchronization circuit comprises a counter CMPT that is controlled by a logic machine FSM ("Finite State Machine"). For this purpose, the logic machine FSM applies a reset signal RST and a count enable signal ENBL to the counter. The counter is paced by a signal Sc of frequency Fc supplied by an oscillator. The counter supplies a value N1' that is equal to a counting value N1 to which the offset equal to 20, already described above, is added.

Advantageously, the offset is added to the counting value by configuring the counter so that it sets itself to the value 20 instead of the value 0 after application of the reset signal RST. Thus, as soon as the counting begins, the value 20 is present in the counter, and is therefore added to the counting value. The output of the counter, supplying the value N1'=N1+20, is applied to the shift circuits SHCT1 and SHCT2 described above, respectively performing a division by 32 and a division by 64 by right shift without any carry after the decimal point. The output of each circuit SHCT1 and SHCT2 is applied as above to the adder AD1, that supplies the result N1/(64/3).

The logic machine FSM activates the counter by taking the signal ENBL to 1, upon detecting a determined event, such as the receipt of a synchronization frame for example (dc signal on 1 received via the interface ICT), and resets the signal ENBL to 0 when the event is no longer detected. When the counting is finished, the value N1/(64/3) supplied by the adder AD1 is used by the integrated circuit to generate an internal signal the period of which Tr is equal to N1/(64/3) *Tc. This signal is therefore synchronized with an external clock signal having been used to generate the synchronization signal (clock signal of the reader). This synchronized signal is for example used as sub-carrier for backscattering steps enabling the integrated circuit to send back data via the antenna circuit ACT.

The offset applied to the counting value N1 enables the rounding error to be minimized during the steps of right shifting, which enables the counter CMPT to be operated with a frequency two times slower to obtain the same precision of division, hence a lower electrical power consumption. From another point of view, the offset enables the division error to be decreased at constant counting frequency.

Figure 9:
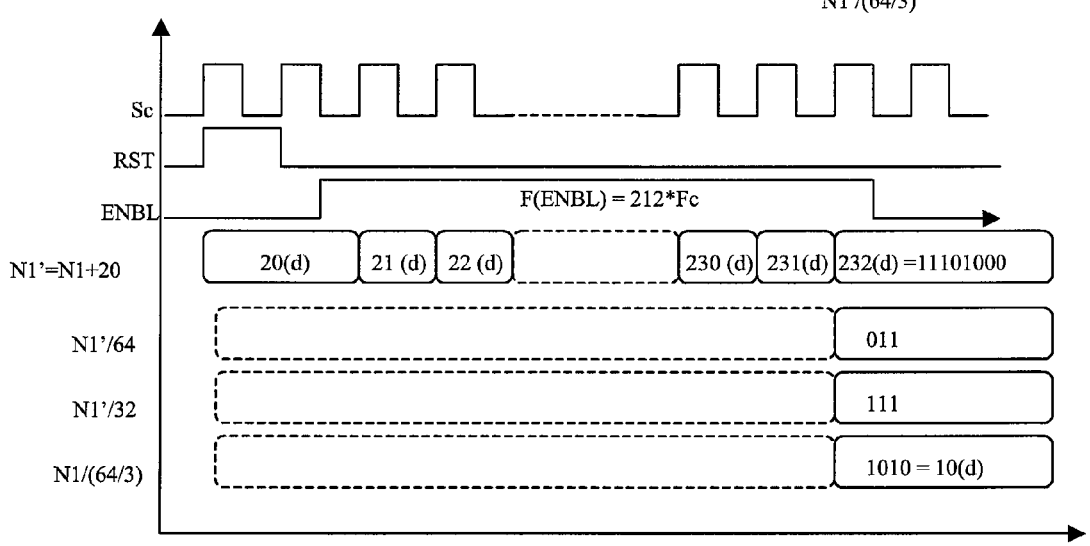
FIG. 9 is a timing diagram representing logic signals and counting values showing the operation of the elements represented in FIG. 8.

FIG. 9 represents the signals Sc, RST, ENBL, and the counting value N1' (i.e., N1+20), the divided values N1'/64 and N1'/32, and the result N1/(64/3). In the example represented, the signal ENBL is reset to 0 when the counting value N' is equal to 232 (the values expressed in decimal are marked by the sign "(d)" in FIG. 9). The result that should be achieved is therefore, in theory, 212/(64/3), i.e., 9.93. The value 10 is obtained with the circuit of FIG. 9, i.e., a value very close to 9.93.

To sum up the advantages of the offset, Table 2 summarizes the basic operations carried out by the divider with and without offset. It can be seen that the value that would be obtained without any offset would be equal to 9 instead of 9.93 and would therefore be marred by a significant error.

TABLE 2

|  | Without offset | With offset |
|---|---|---|
| N1 in decimal | 212 | 232 |
| N1 in binary | 11010100 | 11101000 |
| N1/64 (six right shifts) | 00000011 | 00000011 |
| N1/32 (five right shifts) | 00000110 | 00000111 |
| N1/(64/3) in binary | 00001001 | 00001010 |
| N1/(64/3) in decimal | 9 | 10 |

It will be understood by those skilled in the art that various alternative embodiments, improvements and applications of the present invention are possible.

In particular, although the description above was of examples of embodiments of a divider by 64/3, a divider according to the present invention can be of configurable type, i.e., come in the form of a divider by $2^n/k$ with k and n being variable parameters applied to the divider. In this case, the divider comprises in parallel a plurality of basic dividers by $2^n$, $2^{n-1}$, $2^{n-2}$, etc. that are activated or, on the contrary, are inhibited according to the value of k, in accordance with the equation 6. Similarly, the optimal common offset can be supplied by a table in which an optimal offset value is saved for several values of k and of n.

The invention claimed is:

1. A method, comprising:
dividing a first binary number N1 by a second binary number which can be written in the form $2^n/k$, n and k being whole numbers, and obtaining a result N2, the dividing step including:
calculating terms $N1*Ki/2^{n-i}$ using a first hard-wired logic circuit, for i ranging from 0 to N, the terms Ki being constituent bits K0, K1, K2, ... $K^{N-1}$ of the number k expressed in binary; and
adding the terms $N1*Ki/2^{n-i}$ using a second hard-wired logic circuit.

2. The method according to claim 1 comprising, for calculating each term $N1*Ki/2^{n-i}$ for which Ki=1, the application of n−i right shifts to the bits of the number N1, without any carry after the decimal point and with the introduction of a rounding error.

3. The method according to claim 2, wherein the rounding error in the division of N1 by $2^{n-i}$ is offset in whole or in part by adding an offset to the number N1 before applying the n−i right shifts to the bits of the number N1.

4. The method according to claim 3, wherein an identical offset is added to the number N1 for calculating each term $N1*Ki/2^{n-i}$ for which Ki=1.

5. The method according to claim 4, wherein the number N1 is supplied by a counter configured to count from the offset instead of counting from 0.

6. The method according to claim 1, wherein:

k=3, and $$N2=N1/2^n+N1/2^{n-1}$$

the term $N1/2^n$ being calculated by applying n right shifts to the bits of a number equal to the sum of N1 and of a first offset, the term $N1/2^{n-1}$ being calculated by applying n−1 right shifts to the bits of a number equal to the sum of N1 and of a second offset, the first and second offsets possibly being equal.

7. A divider circuit for dividing a first binary number N1 by a second binary number which can be written in the form $2^n/k$, n and k being whole numbers, and obtaining a result N2, comprising:

a first hard-wired logic circuit structured to calculate terms $N1*Ki/2^{n-i}$ for i ranging from 0 to N, Ki being the constituent bits K0, K1, K2, . . . $K_{N-1}$ of the number k expressed in binary, and a second hard-wired logic circuit structured to add the terms $N1*Ki/2^{n-i}$.

8. The divider circuit according to claim 7, wherein the first hard-wired logic circuit is structured to calculate each term $N1*Ki/2^{n-i}$ for which Ki=1 by applying n−i right shifts to the bits of the number N1, without any carry after the decimal point and with the introduction of a rounding error.

9. The divider circuit according to claim 8, comprising means for adding an offset to the number N1 before applying the right shifts to the bits of the number N1, so as to offset in whole or in part the rounding error in the division of N1 by $2^{n-i}$.

10. The divider circuit according to claim 9, wherein the means for adding an offset apply an offset identical to the number N1 for calculating each term $N1*Ki/2^{n-i}$ for which Ki=1.

11. The divider circuit according to claim 10, wherein the number N1 is supplied by a sampling counter configured to count from the offset instead of counting from 0, so as to supply the number N1 increased by the offset.

12. The divider circuit according to claim 7, wherein:

k=3, and $N2 = N1/2^n + N1/2^{n-1}$ and wherein:
the term $N1/2^n$ is supplied by a first shift circuit which applies n right shifts to the bits of a number equal to the sum of N1 and of a first offset, and the term $N1/2^{n-1}$ is supplied by a second shift circuit which applies n−1 right shifts to the bits of a number equal to the sum of N1 and of a second offset, the first and second offsets possibly being equal.

13. The divider circuit according to claim 7, wherein the first hard-wired logic circuit includes a plurality of shift circuits, each shift circuit calculating a respective one of the terms $N1*Ki/2^{n-i}$.

14. The divider circuit according to claim 13, wherein the first hard-wired logic circuit includes an adder coupled to each of the shift circuits, the adder having a first input that receives the first binary number N, a second input that receives an offset value, and an output that provides to each shift circuit an output value equal to the first binary number N plus the offset value.

15. The divider circuit according to claim 13, wherein the first hard-wired logic circuit includes:
a first adder coupled to a first one of the shift circuits, the first adder having a first input that receives the first binary number N, a second input that receives a first offset value, and an output that provides to the first shift circuit a first output value equal to the first binary number N plus the first offset value; and a second adder coupled to a second one of the shift circuits, the second adder having a first input that receives the first binary number N, a second input that receives a second offset value, and an output that provides to the second shift circuit a second output value equal to the first binary number N plus the second offset value.

16. A transponder, comprising:
an antenna; and
a divider circuit coupled to the antenna and structured to divide a first binary number N1 by a second binary number which can be written in the form $2^n/k$, n and k being whole numbers, and obtaining a result N2, the divider circuit including:

a first hard-wired logic circuit structured to calculate terms $N1*Ki/2^{n-i}$ for i ranging from 0 to N, Ki being the constituent bits K0, K1, K2, . . . $K_{N-1}$ of the number k expressed in binary, and a second hard-wired logic circuit structured to add the terms $N1*Ki/2^{n-i}$.

17. The transponder according to claim 16, further comprising a counter that supplies a counting value to the divider circuit, wherein the divider circuit is arranged for dividing the counting value supplied by the counter.

18. The transponder according to claim 17, wherein the counter is configured to count from an offset value instead of counting from 0, so as to supply the number N1 increased by the offset.

19. The transponder according to claim 16, wherein the first hard-wired logic circuit is structured to calculate each term $N1*Ki/2^{n-i}$ for which Ki=1 by applying n−i right shifts to the bits of the number N1, without any carry after the decimal point and with the introduction of a rounding error.

20. The transponder according to claim 19, comprising means for adding an offset to the number N1 before applying the right shifts to the bits of the number N1, so as to offset in whole or in part the rounding error in the division of N1 by $2^{n-i}$.

21. The transponder according to claim 20, wherein the means for adding an offset apply an offset identical to the number N1 for calculating each term $N1*Ki/2^{n-i}$ for which Ki=1.

22. The transponder according to claim 16, wherein:

k=3, and $N2 = N1/2^n + N1/2^{n-1}$ and wherein:
the term $N1/2^n$ is supplied by a first shift circuit which applies n right shifts to the bits of a number equal to the sum of N1 and of a first offset, and the term $N1/2^{n-1}$ is supplied by a second shift circuit which applies n−1 right shifts to the bits of a number equal to the sum of N1 and of a second offset, the first and second offsets possibly being equal.

23. The transponder according to claim 16, wherein the first hard-wired logic circuit includes a plurality of shift circuits, each shift circuit calculating a respective one of the terms $N1*Ki/2^{n-i}$.

24. The transponder according to claim 23, wherein the first hard-wired logic circuit includes an adder coupled to each of the shift circuits, the adder having a first input that receives the first binary number N, a second input that receives an offset value, and an output that provides to each shift circuit an output value equal to the first binary number N plus the offset value.

25. The transponder according to claim 23, wherein the first hard-wired logic circuit includes:
a first adder coupled to a first one of the shift circuits, the first adder having a first input that receives the first binary number N, a second input that receives a first offset value, and an output that provides to the first shift circuit a first output value equal to the first binary number N plus the first offset value; and a second adder coupled to a second one of the shift circuits, the second adder having a first input that receives the first binary number N, a second input that receives a second offset value, and an output that provides to the second shift circuit a second output value equal to the first binary number N plus the second offset value.

* * * * *

UNITED STATES PATENT AND TRADEMARK OFFICE
CERTIFICATE OF CORRECTION

PATENT NO. : 7,801,940 B2  Page 1 of 1
APPLICATION NO. : 11/612765
DATED : September 21, 2010
INVENTOR(S) : Christophe Moreaux et al.

It is certified that error appears in the above-identified patent and that said Letters Patent is hereby corrected as shown below:

Column 8, Line 35
"constituent bits K0, K1, K2,...$K^{N-1}$ of the number k" should read as, --constituent bits K0, K1, K2,...$K_{N-1}$ of the number k--.

Column 10, Line 31
"k = 3, and
$N2 = N1/2^n + N/2^{n-1}$"
should read as,
--k = 3, and
$N2 = N1/2^n + N1/2^{n-1}$--.

Signed and Sealed this

Twenty-first Day of December, 2010

David J. Kappos
*Director of the United States Patent and Trademark Office*